(12) United States Patent
Tsai

(10) Patent No.: US 8,391,823 B2
(45) Date of Patent: Mar. 5, 2013

(54) SIGNAL PROCESSING APPARATUS HAVING FREQUENCY-SELECTIVE CIRCUIT WITH MIXER MODULE IMPLEMENTED FOR CONTROLLING FREQUENCY RESPONSE AND RELATED METHOD THEREOF

(75) Inventor: Ming-Da Tsai, Miaoli County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 95 days.

(21) Appl. No.: 13/039,322

(22) Filed: Mar. 3, 2011

(65) Prior Publication Data

US 2011/0230152 A1    Sep. 22, 2011

Related U.S. Application Data

(63) Continuation-in-part of application No. 12/959,345, filed on Dec. 2, 2010.

(60) Provisional application No. 61/370,270, filed on Aug. 3, 2010, provisional application No. 61/315,066, filed on Mar. 18, 2010.

(51) Int. Cl.
*H04B 1/26* (2006.01)
(52) U.S. Cl. ........ 455/323; 455/296; 455/118; 455/333; 455/293; 375/316
(58) Field of Classification Search .................. 455/323, 455/296, 118, 333, 293; 375/316
See application file for complete search history.

(56) References Cited

U.S. PATENT DOCUMENTS

| 6,215,828 B1* | 4/2001 | Signell et al. ................. 375/316 |
| 8,175,552 B2* | 5/2012 | Takemura ..................... 455/118 |
| 2005/0164669 A1 | 7/2005 | Molnar |
| 2011/0206088 A1* | 8/2011 | Binder et al. ................. 375/136 |
| 2012/0083236 A1* | 4/2012 | Thomas et al. ............... 455/296 |

OTHER PUBLICATIONS

Kim, "A Highly Linear SAW-less CMOS Receiver Using a Mixer with Embedded Tx Filtering for CDMA", pp. 729-732, IEEE 2008 Custom Intergrated Circuits Conference (CICC), 2008.
Darabi, "A Blocker Filtering Technique for SAW-Less Wireless Receivers", pp. 2766-2773, IEEE Journal of Solid-State Circuits, Vol. 42, No. 12, Dec. 2007.

* cited by examiner

*Primary Examiner* — Sanh Phu
(74) *Attorney, Agent, or Firm* — Winston Hsu; Scott Margo

(57) ABSTRACT

A method of setting filtering characteristic of a signal processing apparatus includes following steps: configuring a first signal processing path, included in the signal processing apparatus and electrically connected to a signal input port of the signal processing apparatus, to have a first filtering characteristic; and configuring a second signal processing path, included in the signal processing apparatus and electrically connected between the signal input port and the first signal processing path, to have a second filtering characteristic different from the first filtering characteristic. When an input signal received at the signal input port includes a first signal component with a first frequency and a second signal component with a second frequency, most of the first signal component is processed by the first signal processing path, and most of the second signal component is processed by the second signal processing path.

23 Claims, 8 Drawing Sheets

SIGNAL PROCESSING APPARATUS HAVING FREQUENCY-SELECTIVE CIRCUIT WITH MIXER MODULE IMPLEMENTED FOR CONTROLLING FREQUENCY RESPONSE AND RELATED METHOD THEREOF

CROSS REFERENCE TO RELATED APPLICATIONS

This continuation-in-part application claims the benefit of co-pending U.S. patent application Ser. No. 12/959,345 (filed on Dec. 2, 2010), which claims the benefit of U.S. provisional application No. 61/315,066 (filed on Mar. 18, 2010) and U.S. provisional application No. 61/370,270 (filed on Aug. 3, 2010). The entire contents of these related applications are incorporated herein by reference.

BACKGROUND

The disclosed embodiments of the present invention relate to filtering out blocker signals, and more particularly, to a signal processing apparatus having a frequency-selective circuit with a mixer module implemented for controlling a frequency response of the frequency-selective circuit and related method thereof.

In general, a wireless communication receiver is required to have the capability of detecting weak signals in the desired frequency band. Specifically, the wireless communication receiver is required to detect in-band signals in the presence of very strong out-of-band (OOB) signals (i.e., blocker signals). The most common solution to solving problems caused by very strong blocker signals is to use very high quality factor (Q) bandpass filters at the input of the wireless communication receiver. For example, surface acoustic wave (SAW) filters may be employed to offer the desired attenuation of OOB blocker signals. However, using SAW filters leads to significantly increased cost and circuit board area.

Thus, there is a need for an innovative design which can effectively attenuate or eliminate the unwanted signal components (e.g., the blocker signals) by using a simple circuit architecture.

SUMMARY

In accordance with exemplary embodiments of the present invention, a signal processing apparatus having a frequency-selective circuit with a mixer module implemented for controlling a frequency response of the frequency-selective circuit and related method are proposed to solve the above-mentioned problem.

According to a first aspect of the present invention, an exemplary signal processing apparatus includes a frequency-selective circuit and a signal processing circuit. The frequency-selective circuit includes a signal input port, a first signal output port, a second signal output port, and a frequency response control block. The frequency response control block is electrically connected between the second signal output port and a signal path between the signal input port and the first signal output port, and arranged to control a frequency response according to a frequency of an oscillating signal. The signal processing circuit is electrically connected to the frequency-selective circuit, and arranged to deal with an input signal received by the signal input port and arranged to deal with output signals generated from the first and second signal output ports.

According to a second aspect of the present invention, an exemplary signal processing apparatus includes a frequency-selective circuit and a signal processing circuit. The frequency-selective circuit has a signal input port, a first signal output port, a second signal output port, and a frequency response control block. The frequency response control block includes a first mixer module and a first filter module. The first mixer module has a first port, a second port, and a local oscillator (LO) port, the first port is electrically connected to a signal path between the signal input port and the first signal output port, and the first mixer module operates according to a first LO input received by the LO port. The first filter module is electrically connected between the second port of the first mixer module and the second signal output port. The signal processing circuit is electrically connected to the frequency-selective circuit, and includes a first circuit module arranged to deal with an input signal received by the signal input port, and a second circuit module arranged to deal with output signals generated from the first and second signal output ports.

According to a third aspect of the present invention, an exemplary method of setting filtering characteristic of a signal processing apparatus includes following steps: configuring a first signal processing path, included in the signal processing apparatus and electrically connected to a signal input port of the signal processing apparatus, to have a first filtering characteristic; and configuring a second signal processing path, included in the signal processing apparatus and electrically connected between the signal input port and the first signal processing path, to have a second filtering characteristic different from the first filtering characteristic.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "electrically connected" is intended to mean either an indirect or direct electrical connection. Accordingly, if one device is electrically connected to another device, that connection may be through a direct electrical connection, or through an indirect electrical connection via other devices and connections.

Figure 1:
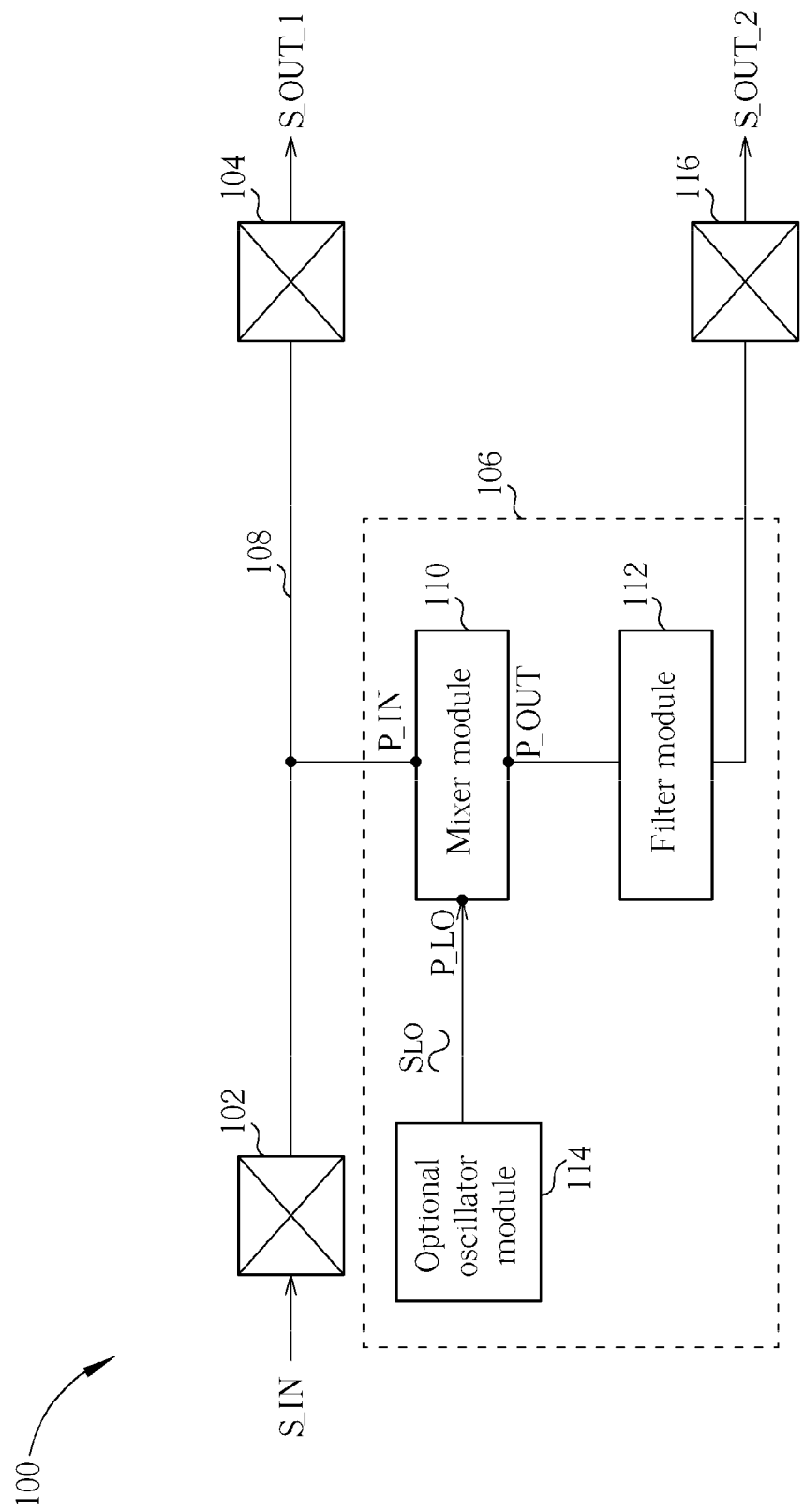
FIG. 1 is a diagram illustrating a frequency-selective circuit according to a first exemplary embodiment of the present invention.

Please refer to FIG. 1, which is a diagram illustrating a frequency-selective circuit according to a first exemplary embodiment of the present invention. The exemplary frequency-selective circuit 100 includes, but is not limited to, a signal input port 102, a first signal output port 104, a second signal output port 116, and a frequency response control block 106. The signal input port 102 is arranged to receive an input signal S_IN of the frequency-selective circuit 100. The first signal output port 104 is electrically connected to the signal input port 102 via a signal path 108. The first signal output port 104 and the second signal output port 116 are arranged to transmit output signals S_OUT_1 and S_OUT_2 of the frequency-selective circuit 100 to other circuitry, respectively. In this exemplary embodiment, the frequency response control block 106 is arranged to control a frequency response presented at the signal path 108, and therefore includes, but is not limited to, a mixer module 110, a filter module 112, and an optional oscillator module 114. The mixer module 110 has a first port P_IN, a second port P_OUT, and a local oscillator (LO) port P_LO, wherein the first port P_IN is electrically connected to the signal path 108, the second port P_OUT is electrically connected to the filter module 112, and the LO port P_LO is electrically connected to the optional oscillator module 114. The mixer module 110 operates according to an LO input $S_{LO}$ received at the LO port P_LO, and the frequency response presented at the signal path 108 is controlled by a frequency of the LO input $S_{LO}$. Regarding the filter module 112, it is electrically connected between the second port P_OUT of the mixer module 110 and the second signal output port 116 of the frequency-selective circuit 100. In one exemplary design, the mixer module 110 may be implemented using a passive mixer, and the filter module 112 may be implemented using a low-pass filter (LPF). However, this is for illustrative purposes only. In an alternative design, the mixer module 110 may be implemented using an active mixer and/or the filter module 112 may be realized using other filter architecture (e.g., a band-pass filter), depending upon actual design consideration.

The oscillator module 114 is electrically connected to the mixer module 110, and arranged to generate the LO input $S_{LO}$ to the mixer module 110. By way of example, but not limitation, the oscillator module 114 may be implemented using a frequency divider and a controllable oscillator such as a voltage-controlled oscillator (VCO), where the VCO generates an oscillating signal, and the frequency divider outputs the LO input $S_{LO}$ with a desired frequency by dividing the frequency of the oscillating signal. Alternatively, the oscillator module 114 may be implemented using a phase-locked loop (PLL) or a crystal oscillator. Moreover, the above-mentioned oscillator module 114 may be arranged to directly generate the LO input $S_{LO}$ with a constant LO frequency or generate the LO input $S_{LO}$ by fine-tuning the LO frequency.

It should be noted that the oscillator module 114 included in the frequency response control block 106 is optional. That is, in a case where a particular application which employs the frequency-selective circuit 100 has a clock source disposed outside of the frequency-selective circuit 100 for providing a clock signal that can also serve as the desired LO input $S_{LO}$, the oscillator module 114 shown in FIG. 1 may be omitted. The operation of the frequency-selective circuit 100 is detailed as below.

Figure 2:
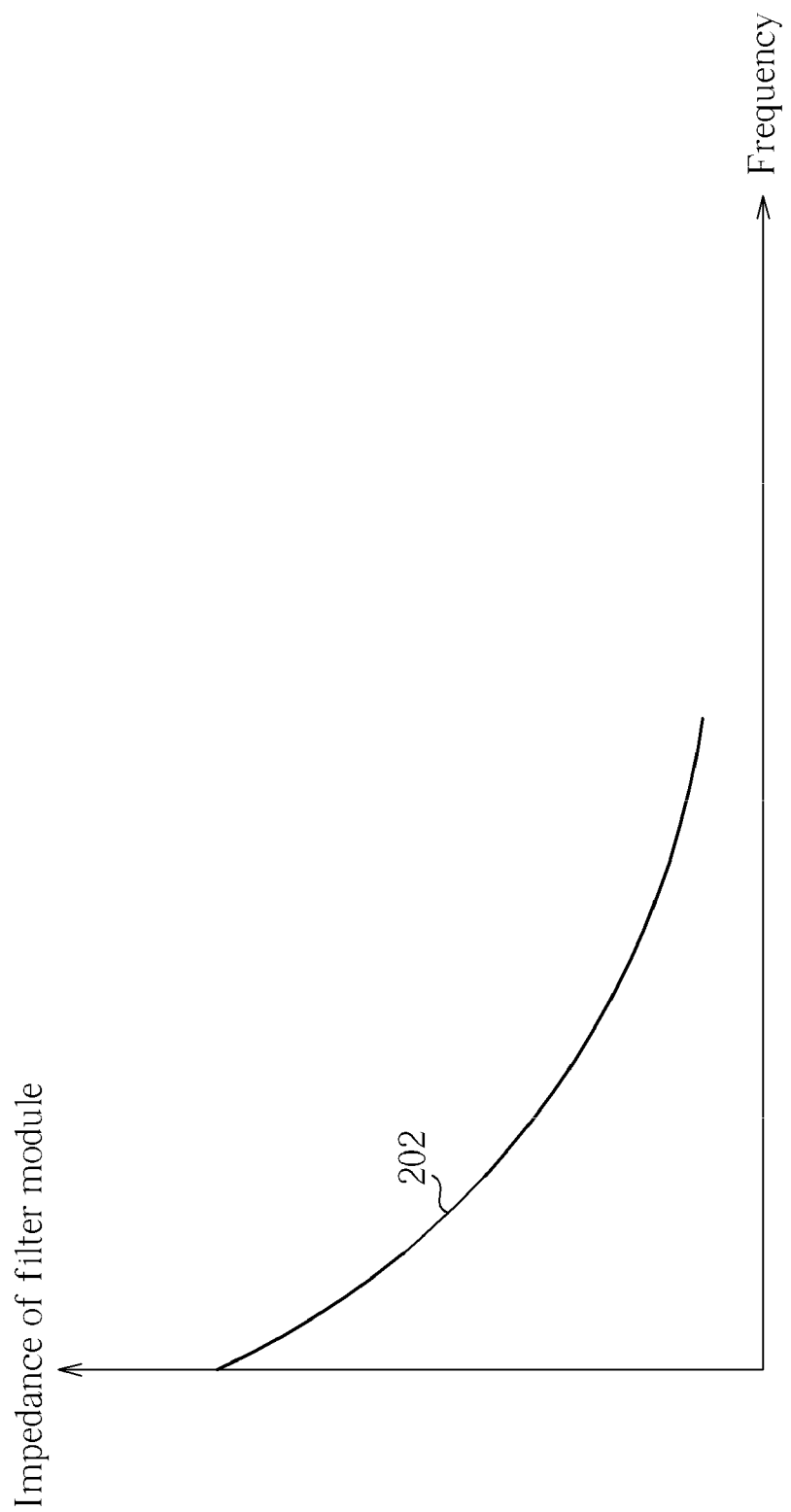
FIG. 2 is a diagram illustrating an exemplary impedance response of the filter module shown in FIG. 1.
Figure 3:
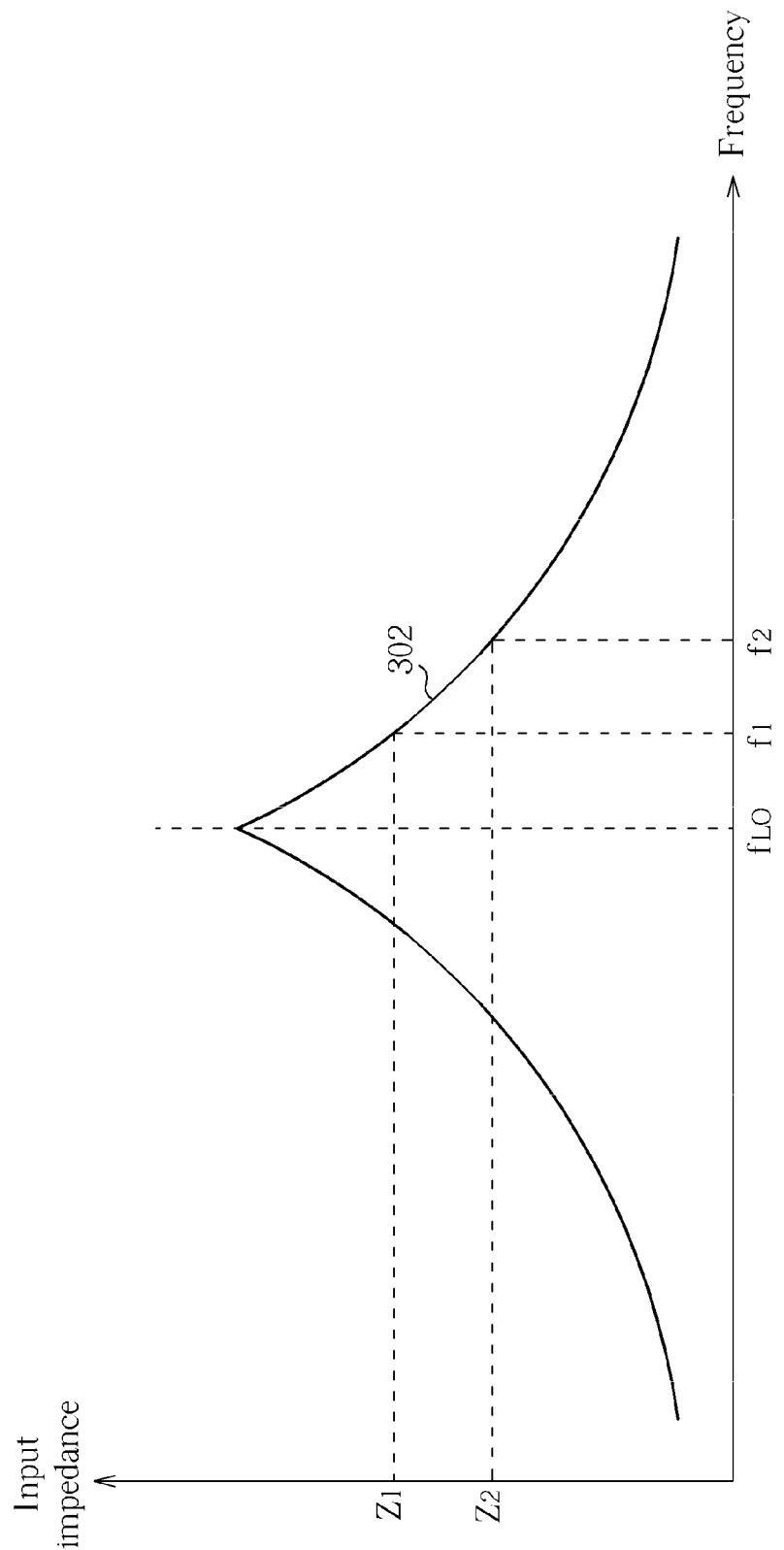
FIG. 3 is a diagram of an exemplary input impedance response of the frequency response control block shown in FIG. 1.

Please refer to FIG. 2 in conjunction with FIG. 3. FIG. 2 is a diagram illustrating an exemplary impedance response 202 of the filter module 112 shown in FIG. 1, and FIG. 3 is a diagram of an exemplary input impedance response 302 of the frequency response control block 106 shown in FIG. 1. The frequency response of the impedance of the filter module (e.g., an LPF) 112 can be translated to the frequency $f_{LO}$ of the LO input $S_{LO}$ by the mixer module (e.g., a passive mixer) 110 which operates according to the LO input $S_{LO}$. As can be seen from the characteristic curve 302 which represents the input impedance response 302 of the frequency response control block 106, the input impedance response of the frequency response control block 106 (i.e., the frequency response of an input impedance looking into the first port P_IN of the mixer module 110) has a first impedance value $Z_1$ at a first frequency $f_1$ and a second impedance value $Z_2$ at a second frequency $f_2$, wherein an offset between the first frequency $f_1$ and the frequency $f_{LO}$ of the LO input $S_{LO}$ is smaller than an offset between the second frequency $f_2$ and the frequency $f_{LO}$ of the LO input $S_{LO}$, and the first impedance value $Z_1$ is greater than the second impedance value $Z_2$. More specifically, in accordance with the impedance response of the filter module 112 as represented by the characteristic curve 202 shown in FIG. 2, the input impedance response of the frequency response control block 106 therefore has a maximum impedance value at the frequency $f_{LO}$ of the LO input $S_{LO}$. Therefore, when a signal component with a frequency far away from the frequency $f_{LO}$ of the LO input $S_{LO}$ is transmitted via the signal path 108, the frequency response control block 106 has a lower input impedance presented at the first port P_IN of the mixer module 110. Thus, part or all of the current of such a signal component will be guided to flow through the frequency response control block 106. On the other hand, when a signal component with a frequency close to the frequency $f_{LO}$ of the LO input $S_{LO}$ is transmitted via the signal path 108, the frequency response control block 106 has a higher input impedance presented at the first port P_IN of the mixer module 110. Thus, most or all of the current of such a signal component will arrive at the first signal output port 104.

Based on above observation, the frequency response control block 106 can be used to significantly attenuate or completely block the unwanted signal components included in the input signal S_IN, and allow wanted signal components included in the input signal S_IN to arrive at the first signal output port 104 with less attenuation or without any attenuation. For example, the input signal S_IN received at the signal input port 102 includes a first signal component with the first frequency $f_1$ and a second signal component with the second frequency $f_2$. As mentioned above, an offset between the first frequency $f_1$ and the frequency $f_{LO}$ of the LO input $S_{LO}$ is smaller than an offset between the second frequency $f_2$ and the frequency $f_{LO}$ of the LO input $S_{LO}$. Therefore, an attenuation applied to the second signal component by the frequency response control block 106 would be greater than an attenuation applied to the first signal component by the frequency response control block 106.

Figure 4:
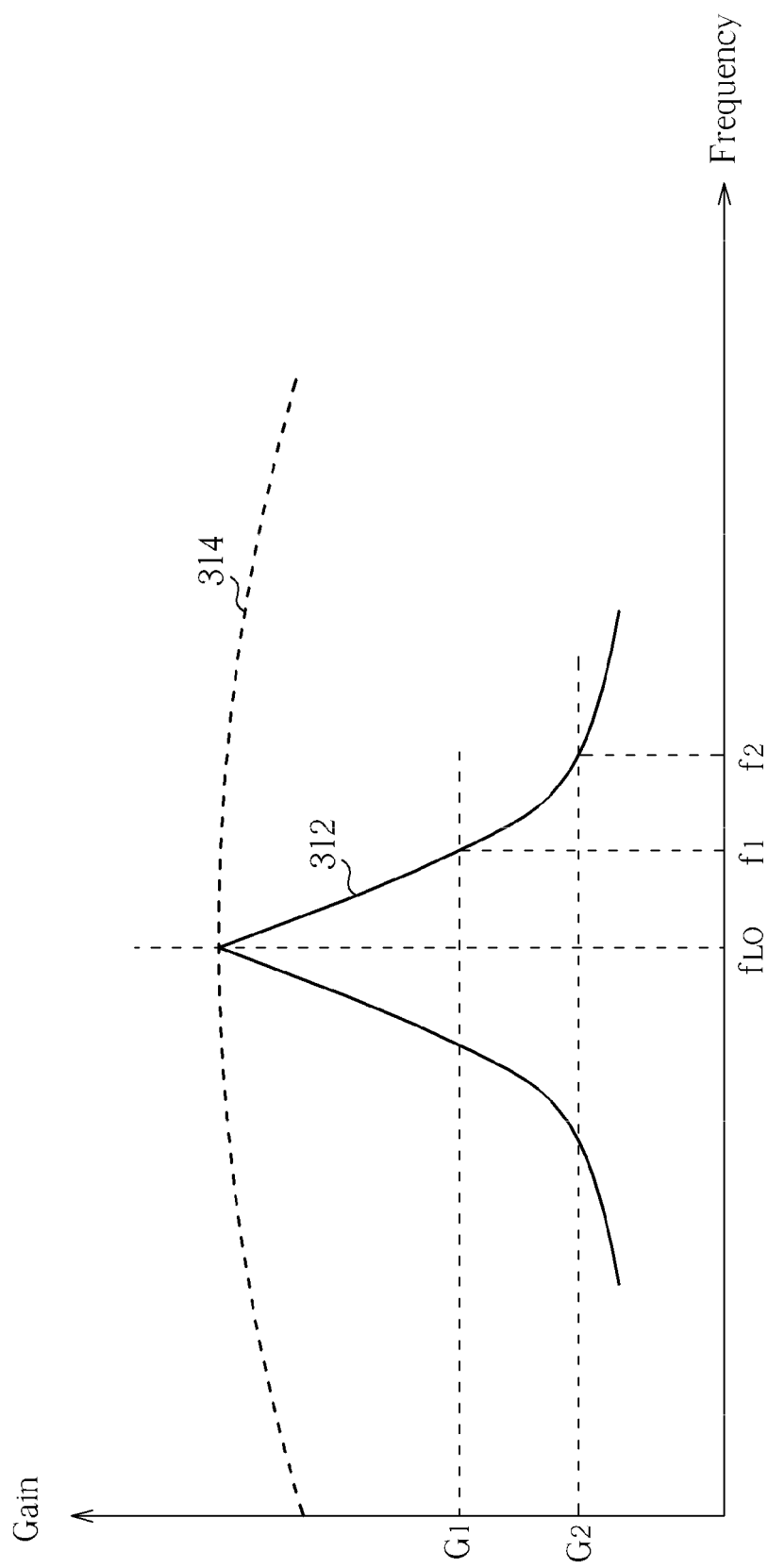
FIG. 4 is a diagram illustrating a frequency response of the frequency-selective circuit shown in FIG. 1.

Please refer to FIG. 4, which is a diagram illustrating a frequency response of the frequency-selective circuit 100 shown in FIG. 1. The characteristic curve 314 shows the frequency response under the condition where the frequency response control block 106 in FIG. 1 is omitted, whereas the characteristic curve 312 shows the frequency response under the condition where the frequency response control block 106 in FIG. 1 is implemented and connected to the signal path 108 in a parallel manner. The frequency response control block 106 with the impedance response 302 enables the frequency-selective circuit 100 to have the frequency response shown in FIG. 4. As can be seen from the figure, the frequency response of the frequency-selective circuit 100 has a first gain $G_1$ at the first frequency $f_1$ and a second gain $G_2$ at the second frequency $f_2$. As mentioned above, an offset between the first frequency $f_1$ and the frequency $f_{LO}$ of the first LO input $S_{LO}$ is smaller than an offset between the second frequency $f_2$ and the frequency $f_{LO}$ of the first LO input $S_{LO}$, and an attenuation applied to the second signal component with the second frequency $f_2$ by the frequency response control block 106 therefore would be greater than an attenuation applied to the first signal component with the first frequency $f_1$ by the frequency response control block 106. As a result, the first gain $G_1$ is greater than the second gain $G_2$. In this exemplary embodiment, the frequency response of the frequency-selective circuit 100 has a maximum gain at the frequency $f_{LO}$ of the first LO input $S_{LO}$. More specifically, as shown in FIG. 4, the frequency response control block 106 in this exemplary embodiment applies no attenuation to a signal component with a frequency identical to the frequency $f_{LO}$ of the first LO input $S_{LO}$ due to a maximum input impedance presented at the first port P_IN of the mixer module 110.

Please note that the characteristic curves shown in FIG. 2, FIG. 3, and FIG. 4 are for illustrative purposes only. For example, the frequency response of the frequency-selective circuit 100 may be adjusted by making proper modifications to the filter module 112 for changing the impedance response of the filter module 112 and/or controlling a clock source (e.g., the optional oscillator module 114) to change the frequency $f_{LO}$ of the first LO input $S_{LO}$ supplied to the mixer module 110.

Figure 5:
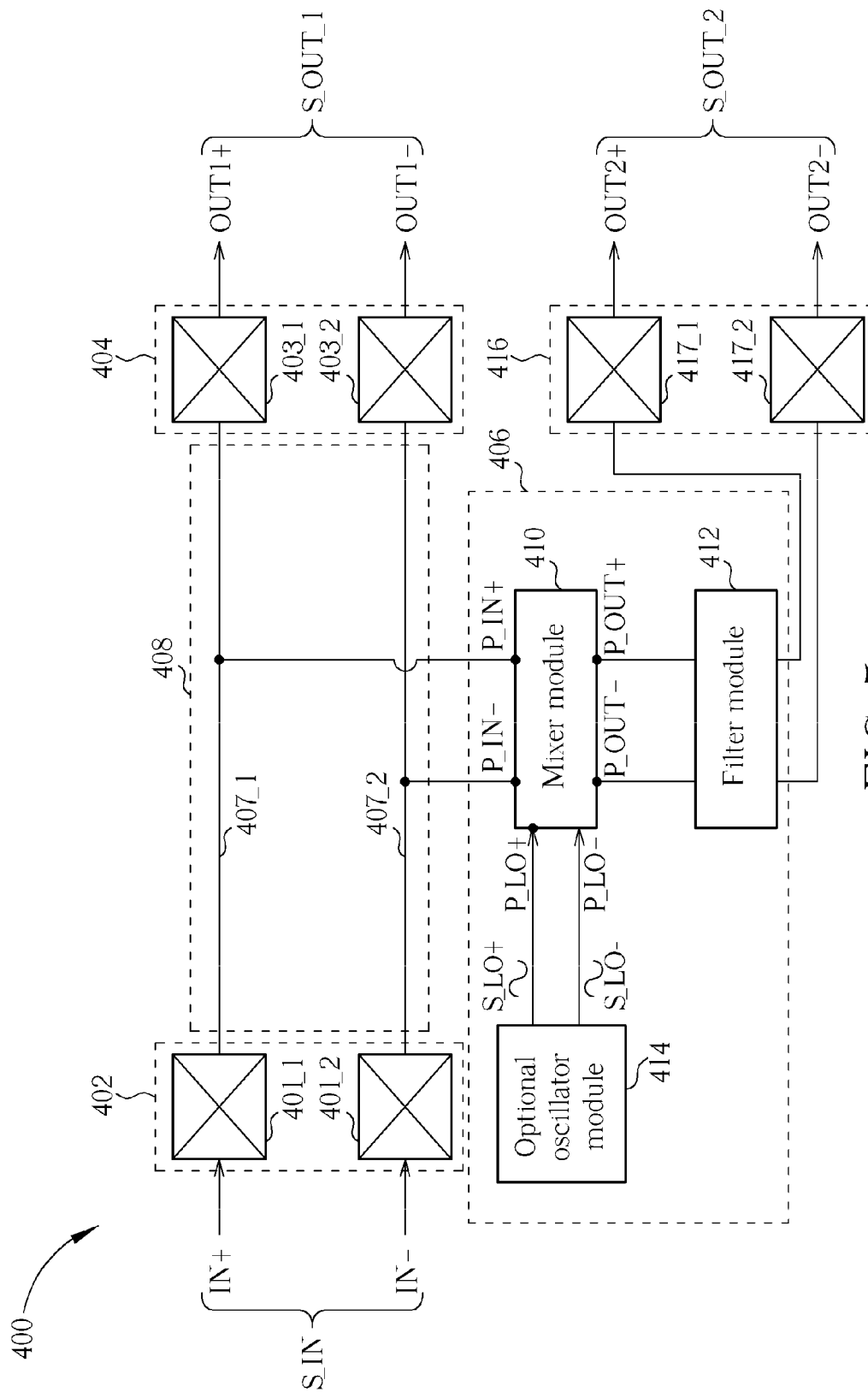
FIG. 5 is a diagram illustrating a frequency-selective circuit according to a second exemplary embodiment of the present invention.

As shown in FIG. 1, the frequency-selective circuit 100 is arranged in a single-ended configuration to meet the requirement of a single-ended application. However, the proposed frequency-selective circuit of the present invention may also be arranged in a differential configuration to meet the requirement of a differential application. Please refer to FIG. 5, which is a diagram illustrating a frequency-selective circuit according to a second exemplary embodiment of the present invention. The exemplary frequency-selective circuit 400 includes, but is not limited to, a signal input port 402, a first signal output port 404, a second signal output port 416, and a frequency response control block 406. The signal input port 402 is arranged to receive an input signal S_IN which is a differential signal pair including a first input IN+ and a second input IN−, and has a first input node 401_1 for receiving the first input IN+ and a second input node 401_2 for receiving the second input IN−. The first signal output port 404 is electrically connected to the signal input port 402 via a signal path 408 including a first path 407_1 and a second path 407_2. The first signal output port 404 and the second signal output port 416 are arranged to transmit output signals S_OUT_1 and S_OUT_2 each being a differential signal pair. More specifically, the first signal output port 404 has a first output node 403_1 for outputting a first output OUT1+ and a second output node 403_2 for outputting a second output OUT1−, and the second signal output port 416 has a first output node 417_1 for outputting a first output OUT2+ and a second output node 417_2 for outputting a second output OUT2−. Similarly, the frequency response control block 406 is arranged to control a frequency response presented at the signal path 408, and therefore includes, but is not limited to, a mixer module 410, a filter module 412, and an optional oscillator module 414. Regarding the frequency-selective circuit 400 operating under a differential mode, the mixer module 110 has a first port including a first input node P_IN+ and a second input node P_IN−, a second port including a first output node P_OUT+ and a second output node P_OUT−, and a local oscillator (LO) port including a first LO node P_LO+ and a second LO node P_LO−.

By way of example, but not limitation, the mixer module 410 may be implemented using two passive mixers or active mixers, the filter module 412 may be implemented using two LPFs, and a clock source (e.g., the optional oscillator module 414) may provide an LO input including a first LO signal S_LO+ and a second LO signal S_LO− respectively supplied to the mixers in the mixer module 410. The first LO signal S_LO+ and the second LO signal S_LO− have the same frequency but different phases. For example, there is a 90-degree phase difference between the first LO signal S_LO+ and the second LO signal S_LO−. As a person skilled in the art can readily understand the operation of the frequency-selective circuit 400 arranged in a differential configuration after reading above paragraphs directed to the frequency-selective circuit 100 arranged in a single-ended configuration, further description is omitted here brevity.

Figure 6:
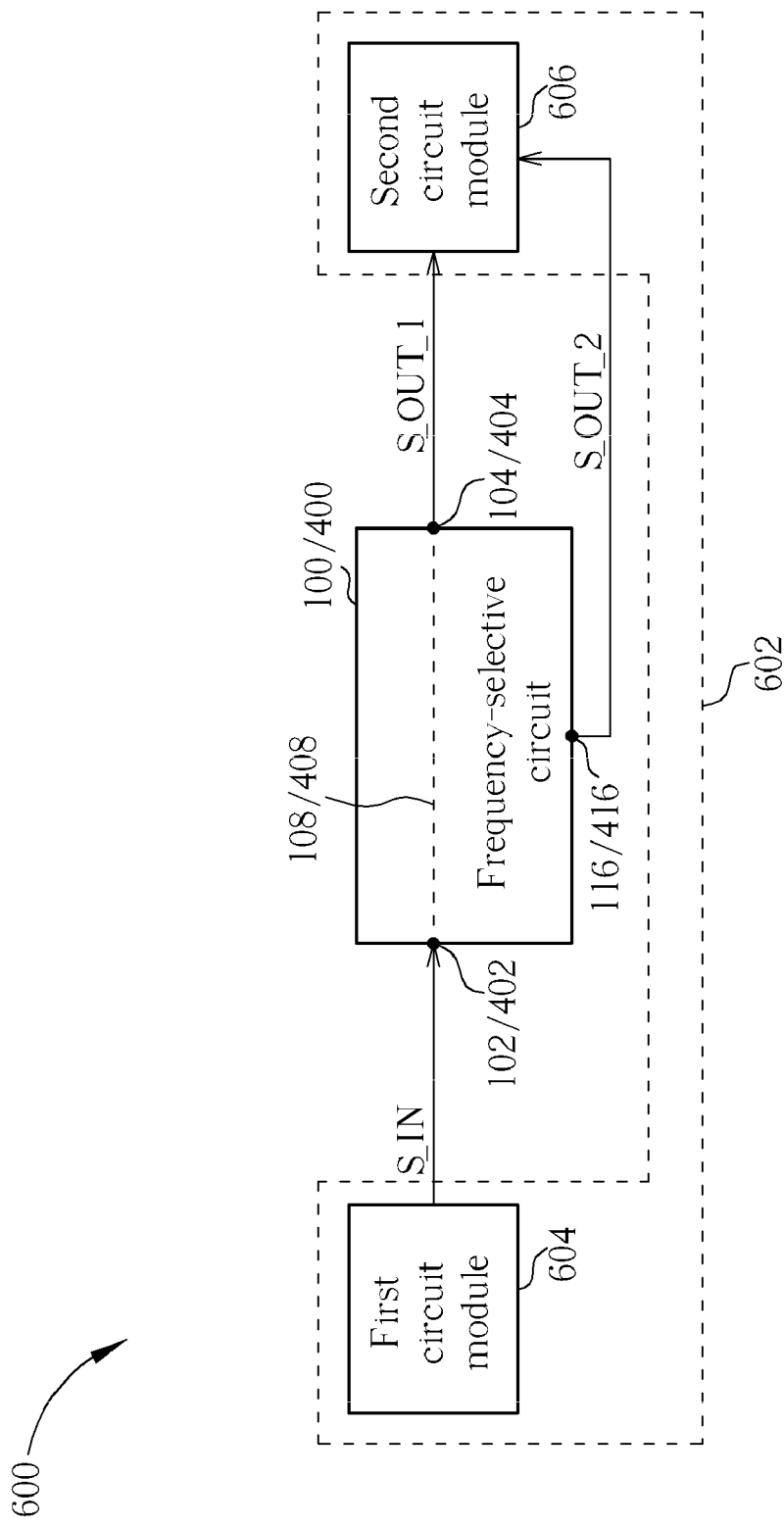
FIG. 6 is a block diagram illustrating a generalized signal processing apparatus having a frequency-selective circuit implemented therein.

Please refer to FIG. 6, which is a block diagram illustrating a generalized signal processing apparatus having a frequency-selective circuit implemented therein. The aforementioned frequency-selective circuit may be employed in any application which requires a frequency-selective signal path. As shown in FIG. 6, the signal processing apparatus 600 has the frequency-selective circuit 100/400 implemented therein to provide the signal path 108/408 that is frequency-selective. In addition, the signal processing apparatus 600 has a signal processing circuit 602 including a first circuit module 604 and a second circuit module 606. The first circuit module 604 is electrically connected to the signal input port 102/402 of the frequency-selective circuit 100/400 and arranged to deal with the input signal S_IN. The second circuit module 606 is electrically connected to the first signal output port 104/404 and the second signal output port 116/416 of the frequency-selective circuit 100/400, and arranged to deal with a plurality of output signals S_OUT_1 and S_OUT_2.

In one exemplary implementation, the signal processing apparatus 600 shown in FIG. 6 may be a receiver with the frequency-selective circuit 100/400 integrated therein. Please refer to FIG. 7, which is a diagram illustrating an exemplary receiver employing the hardware configuration shown in FIG. 6. The exemplary receiver 1400 includes a signal amplification stage 1402, a down-conversion stage 1404, and a frequency-selective circuit 1406. The signal processing circuit 602 shown in FIG. 6 is realized by a receiving circuit 1401 having the signal amplification stage 1402 and the down-conversion stage 1404 included therein. As can be seen from the figure, the first circuit module 604 is realized by the signal amplification stage 1402, and the second circuit module 606 is realized by the down-conversion stage 1404. The receiving circuit 1400 may be implemented using any receiver architecture. For example, in this exemplary embodiment, the signal amplification stage 1402 includes an amplifier 1412 such as a low-noise amplifier (LNA), the down-conversion stage 1404 includes a mixer (e.g., a passive mixer) 1014, a filter such as an LPF 1416, a clock source 1415, and a transimpedance amplifier (TIA) 1417, and the frequency-selective circuit 1406 includes a frequency response control block 1425 which has at least a mixer (e.g., a passive mixer) 1424 and a filter such as an LPF 1426. The clock source 1415 may be implemented using a controllable oscillator (e.g., a VCO) and a frequency divider. In one example, as both of the mixers 1424 and 1414 share the same LO input generated from the clock source 1415, the optional oscillator module mentioned above can be omitted. However, in an alternative design, the LO input required by the mixer 1424 may be supplied by an oscillator module (e.g., the optional mixer module 114 shown in FIG. 1) included in the aforementioned frequency response control block 1425 of the frequency-selective circuit 1406. To put it simply, the LO input required by the mixer 1424 and the LO input required by the mixer 1414 may have the same frequency when they are generated from the same clock source implemented in the down-conversion stage 1404, or may have different frequencies when they are generated from different clock sources respectively implemented in the down-conversion stage 1404 and the frequency-selective circuit 1406.

Figure 7:
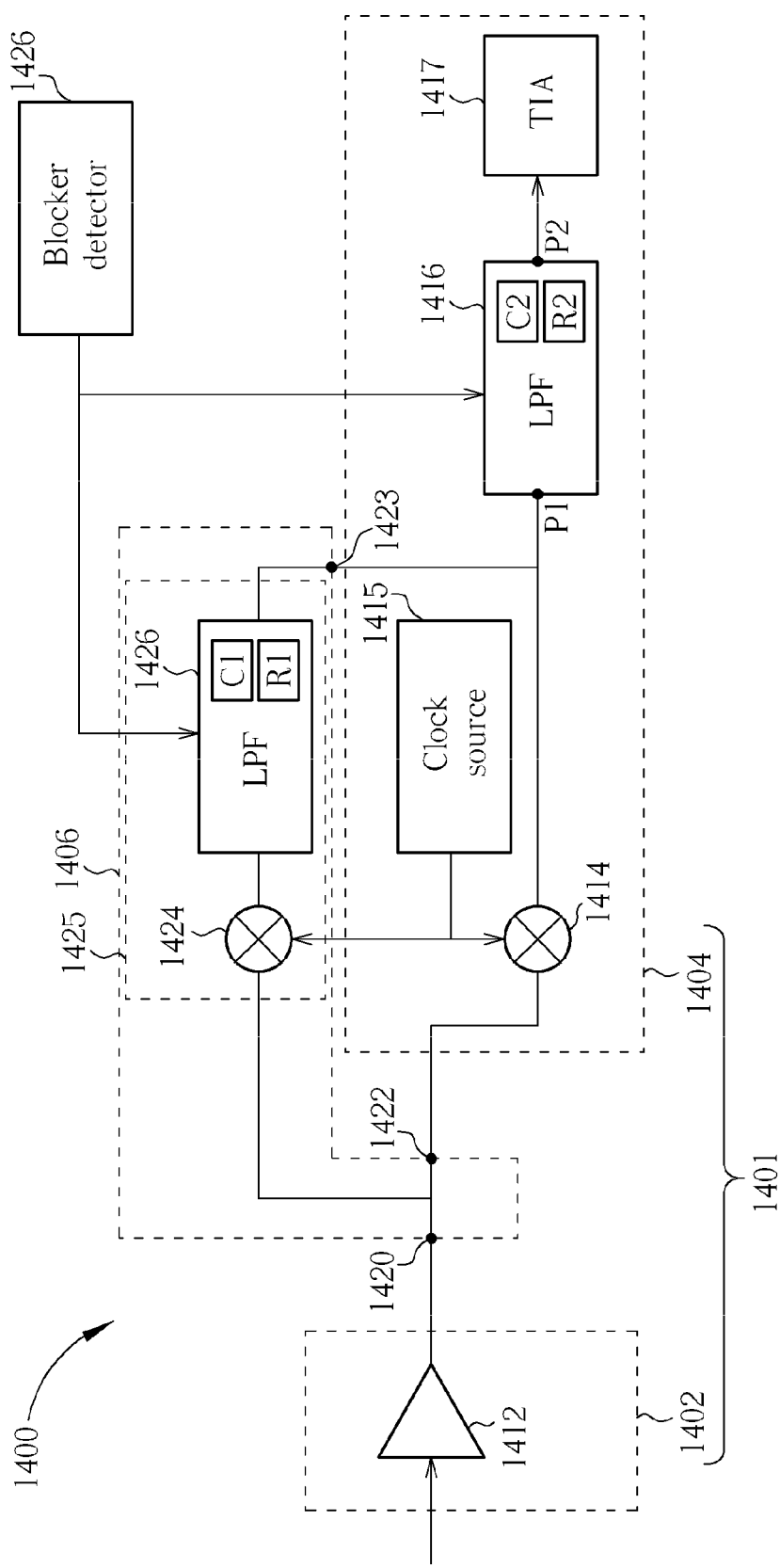
FIG. 7 is a diagram illustrating an exemplary receiver employing the hardware configuration shown in FIG. 6.

Ideally, all of the unwanted signal component (e.g., OOB signal/the blocker signal) presented in an input signal should be guided to flow through the signal path at which the mixer 1424 and the LPF 1426 are disposed, and all of the wanted signal component (e.g., the in-band signal) presented in the input signal should be guided to flow through the signal path at which the mixer 1414 and the LPF 1416 are disposed. In accordance with the frequency selectivity characteristics shown in FIG. 2-FIG. 3, the frequency-selective circuit 1406 with the mixer 1424 and the LPF 1426 can attenuate blocker signals presented at the signal path, thereby improving the linearity of the receiving circuit 1401. However, due to circuit component imperfection, a first portion of the current belonging to the unwanted signal component may flow through one signal path, while a second portion of the current belonging to the unwanted signal component may flow through another signal path; similarly, a first portion of the current belonging to the wanted signal component may flow through one signal path, while a second portion of the current belonging to the wanted signal component may flow through another signal path. The conception of the present invention is to make most of the unwanted signal component (e.g., OOB signal/blocker signal) presented in an input signal flow through the signal path at which the mixer 1424 and the LPF 1426 are disposed and make most of the wanted signal component presented in the input signal flow through the signal path at which the mixer 1414 and the LPF 1416 are disposed. Moreover, as shown in FIG. 7, the input port P1 of the LPF 1416 is electrically connected to a second signal output port 1423 of the frequency-selective circuit 1406 and the mixer 1414 of the down-conversion stage 1404. Therefore, an output of the frequency-selective circuit 1406 is fed into the down-conversion stage 1404 through the second signal output port 1423. Though a portion of the current belonging to the wanted signal component flows through the frequency-selective circuit 1406, it may be filtered by the frequency-selective circuit 1406 with negligible attenuation applied thereto or may be bypassed by the frequency-selective circuit 1406 without any attenuation applied thereto. Therefore, with the combining of outputs of the LPF 1426 and the mixer 1414, a combined signal presented at an input port of the LPF 1416 would have negligible interference or no interference caused by the unwanted signal component, resulting in negligible degradation or no degradation of the wanted signal component.

As mentioned above, the combination of the mixer 1424 and the LPF 1426 is capable of controlling/shaping the frequency response presented at a signal path between a signal input port 1420 and a first signal output port 1422. Thus, the components within the down-conversion stage 1404 and the frequency-selective circuit 1406 should be properly designed to achieve the objective of making most of the unwanted signal component guided into the frequency-selective circuit 1406 and making most of the wanted signal component guided into the down-conversion circuit 1404. In this exemplary embodiment, the LPF 1426 includes a first resistor R1 and a first capacitor C1, and the LPF 1416 has a second resistor R2 and a second capacitor C2. It should be noted that a resistance value of the first resistor R1 is particularly configured to be greater than a resistance value of the second resistor R2, and a capacitance value of the first capacitor C1 is particularly configured to be greater than a capacitance value of the second capacitor C2. By way of example, but not limitation, the resistance value of the first resistor R1 may be 800 ohm, the resistance value of the second resistor R2 may be 100 ohm, the capacitance value of the first capacitor C1 may be 300 pF, and the capacitance value of the second capacitor C2 may be 150 pF. In this way, the corner frequency of the LPF 1426 is approximately 0.3 MHz which is close to a DC frequency, and the corner frequency of the LPF 1426 is approximately 5.3 MHz which is far from the DC frequency.

In a case where a direct conversion receiver (DCR) architecture is employed, the wanted signal component included in the input signal would be directly down-converted to the DC frequency, and the unwanted signal component (e.g., blocker signal) included in the input signal would be directly down-converted to a frequency much higher than the DC frequency. Regarding the wanted signal component at the DC frequency, the equivalent impedance of the LPF 1416 viewed by the wanted signal component would be smaller than the equivalent impedance of the LPF 1426 viewed by the wanted signal component due to the fact that the resistance value of the first resistor R1 is greater than the resistance value of the second resistor R2. Therefore, most of the wanted signal component will be guided to the down-conversion stage 1404.

Regarding the unwanted signal component at a frequency much higher than the DC frequency, the equivalent impedance of the LPF 1426 viewed by the unwanted signal component would be smaller than the equivalent impedance of the LPF 1416 viewed by the unwanted signal component due to the fact that the capacitance value of the first capacitor C1 is greater than the capacitance value of the second capacitor C2. Therefore, most of the unwanted signal component will be guided to the frequency-selective circuit 1406.

Moreover, to further improve the frequency selectivity, the size of the mixer 1414 may be particularly designed to be much smaller than the size of the mixer 1424. In other words, the turn-on resistance of the mixer 1414 would be greater than the turn-on resistance of the mixer 1424. By way of example, but not limitation, the turn-on resistance of the mixer 1414 may be 28 ohm which is much smaller than the resistance value of the second resistor R2, while the turn-on resistance of the mixer 1424 may be 7 ohm which is much smaller than the resistance value of the first resistor R1. Thus, though the turn-on resistance of the mixer 1414 is greater than the turn-on resistance of the mixer 1424 due to smaller mixer size, most of the wanted signal component included in the input signal is still processed by the down-conversion stage 1404 due to the fact that the resistance values of the first resistor R1 and the second resistor R2 dominate the flow of the current of the wanted signal component. However, as the turn-on resistance of the mixer 1424 is smaller than the turn-on resistance of the mixer 1414, it may help to guide the unwanted signal component in the input signal toward the frequency-selective circuit 1406 for further signal processing. It should be noted that, as the corner frequency of the LPF 1426 is particularly designed to be close to the DC frequency, the unwanted signal component guided to the frequency-selective circuit 1406 may be completely filtered out.

To put it simply, regarding the in-band signal (i.e., the wanted signal component), its current at the signal input port 1420 may be split into a first current flowing through one signal path at which the frequency-selective circuit 1406 is disposed and a second current flowing through another signal path at which the down-conversion stage 1404 is disposed. It should be noted that the second current would be much larger than the first current since the input impedance of the frequency-selective circuit 1406 viewed from the signal input port 1420 by the in-band signal (i.e., the wanted signal component) is configured to be much greater than the input impedance of the down-conversion stage 1404 viewed from the signal input port 1420 by the in-band signal (i.e., the wanted signal component). As the frequency-selective circuit 1406 is arranged to filter out signal components belonging to the OOB signal (i.e., the unwanted blocker signal), the first current flowing through the frequency-selective circuit 1406 still carries the signal components of the in-band signal, and is then combined with a mixer output generated from the mixer 1414 which receives the second current. In this way, most of the signal components of the in-band signal will be retained under such a receiver architecture shown in FIG. 7.

Regarding the OOB signal (i.e., the unwanted blocker signal), its current at the signal input port 1420 may also be split into a first current flowing through one signal path at which the frequency-selective circuit 1406 is disposed and a second current flowing through another signal path at which the down-conversion stage 1404 is disposed. It should be noted that the first current would be much larger than the second current since the input impedance of the down-conversion stage 1404 viewed from the signal input port 1420 by the OOB signal is configured to be much greater that the input impedance of the frequency-selective circuit 1406 viewed from the signal input port 1420 by the OOB signal. As the frequency-selective circuit 1406 is arranged to filter out signal components belonging to the OOB signal (i.e., the unwanted blocker signal), most of the signal components of the OOB signal will be filtered out under such a receiver architecture shown in FIG. 7.

Though the LPF 1416 is configured to have a corner frequency (e.g., 5.3 MHz) higher than a corner frequency (e.g., 0.3 MHz) of the LPF 1426, the LPF 1416 is still capable of filtering out any unwanted signal component with a frequency higher than its corner frequency. The effective attenuation $L_{rej(dB)}$ may be simply expressed using following formula:

$$L_{rej(dB)} = -20\log\left(\frac{Z_s}{Z_s + Z_m}\right) - 10\log\left[1 + \left(\frac{f - f_{c1}}{f_{c1}}\right)^2\right],$$

where $Z_m$ represents the input impedance of the signal path at which the down-conversion stage 1404 is disposed, $Z_s$ represents the input impedance of the signal path at which the frequency-selective circuit 1406 is disposed, f represents the blocker offset frequency, and $f_{c1}$ represents the corner frequency of the LPF 1416.

In one exemplary implementation of the present invention, each of the LPFs 1416 and 1426 may be implemented by a current-mode LPF for blocker signal filtering. Thus, the TIA 1417 is coupled to an output port P2 of the LPF 1416 for converting a current output of the LPF 1416 into a voltage signal for further signal processing.

When the input signal received at the signal input port 1420 has no unwanted signal component (e.g., OOB signal/blocker signal) included therein, the first resistor R1 in the LPF 1426 and the second resistor R2 in the LPF 1416 are resistive components which may cause signal loss of the wanted signal component and result in degradation of the gain. In this exemplary embodiment, the first resistor R1 and the second resistor R2 may be implemented by variable resistors, and a block detector 1426 may be employed for detecting existence of a blocker signal in the input signal and accordingly generate a detecting result. When the detecting result indicates that the input signal does not have the blocker signal, implying that the blocker filtering is redundant, the blocker detector 1426 is further arranged to adjust the first resistor R1 for reducing the resistance value of the first resistor R1 and/or adjust the second resistor R2 for reducing the resistance value of the second resistor R2. By way of example, but not limitation, the resistance value of the first resistor R1/second resistor R2 may be reduced to zero (i.e., short-circuited). In this way, the undesired signal loss generated due to the resistive components (e.g., the first resistor R1 and the second resistor R2) is effectively mitigated. It should be noted that the corner frequency of the LPF 1426 will be increased when the resistance value of the first resistor R1 is decreased, and the corner frequency of the LPF 1416 will be increased when the resistance value of the second resistor R2 is decreased. However, as there is no blocker signal presented in the input signal, the adjustment made to the corner frequency has no impact on the reception of the wanted signal component.

Please note that using the blocker detector to adaptively adjust the LPFs 1416 and 1426 according to the detecting result of the blocker signal is for illustrative purposes only, and is not meant to be a limitation to the present invention. In an alternative design, the blocker detector 1426 may be omitted. That is, any receiver circuit using the frequency-selective circuit 1406 falls within the scope of the present invention.

Figure 8:
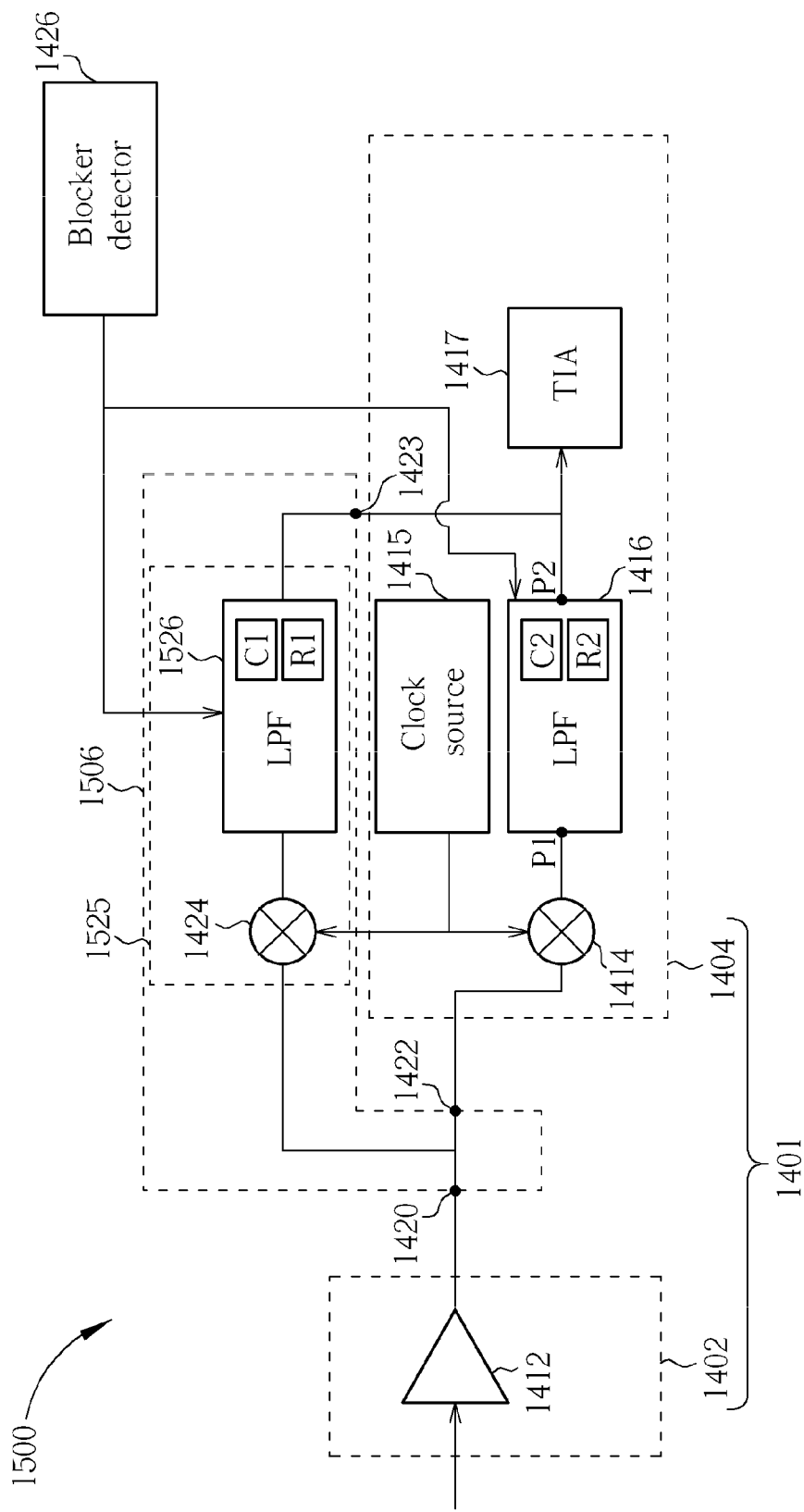
FIG. 8 is a diagram illustrating another exemplary receiver employing the hardware configuration shown in FIG. 6.

FIG. 8 is a diagram illustrating another exemplary receiver employing the hardware configuration shown in FIG. 6. The circuit architecture of the exemplary receiver 1500 shown in FIG. 8 is similar to that of the exemplary receiver 1400 shown in FIG. 7. As shown in the figure, the frequency response control block 1525 in the frequency-selective circuit 1506 shown in FIG. 15 includes at least the mixer 1424 and an LPF 1526; alternatively, the frequency response control block may further include an optional oscillator module (e.g., the oscillator module 114 shown in FIG. 1). The major difference between the exemplary receivers in FIG. 7 and FIG. 8 is that an output of the LPF 1526 in the frequency-selective circuit 1506 shown in FIG. 15 is combined with an output of the LPF 1416 in the down-conversion stage 1404. Thus, a combined signal derived from outputs of the LPFs 1416 and 1526 is processed by the TIA 1417. The same objective of making most of the current of the in-band signal flow through the signal path at which the down-conversion stage is disposed and making most of the current of the OOB signal flow through the signal path at which the frequency-selective circuit is disposed is achieved. As a person skilled in the art can readily understand technical features of the receiver 1500 after reading above paragraphs directed to the receiver 1400 shown in FIG. 14, further description is omitted here for brevity.

It should be noted that the frequency selectivity characteristic of the receiver with multi-path filtering, as shown in FIG. 7 and FIG. 8, may be adjusted by configuring the mixers and/or the filters disposed at different signal paths. In this way, the receiver can attenuate the unwanted OOB/blocker signal more effectively to thereby improve the receiver linearity.

As shown in FIG. 7 and FIG. 8, each of the exemplary receivers 1400 and 1500 is arranged in a single-ended configuration to meet the requirement of a single-ended application. However, each of the proposed exemplary receivers 1400 and 1500 may also be properly modified to have a differential configuration for meeting the requirement of a differential application. This also obeys the spirit of the present invention, and falls within the scope of the present invention. Moreover, the filter module implemented in the frequency-selective circuit 1406/1506 is not limited to an LPF. For example, the filter module may be a bandpass filter as long as the wanted signal component is down-converted to a frequency within a passband of the filter module.

Briefly summarized, an exemplary method of setting filtering characteristic of a signal processing apparatus may include the steps of configuring a first signal processing path, included in the signal processing apparatus and electrically connected to a signal input port of the signal processing apparatus, to have a first filtering characteristic; and configuring a second signal processing path, included in the signal processing apparatus and electrically connected between the signal input port and the first signal processing path, to have a second filtering characteristic different from the first filtering characteristic, wherein when an input signal received at the signal input port includes a first signal component with a first frequency and a second signal component with a second frequency, most of the first signal component is processed by the first signal processing path, and most of the second signal component is processed by the second signal processing path.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing apparatus, comprising:
   a frequency-selective circuit, comprising:
      a signal input port;
      a first signal output port;
      a second signal output port; and
      a frequency response control block, electrically connected between the second signal output port and a signal path between the signal input port and the first signal output port, the frequency response control block arranged to control a frequency response according to a frequency of an oscillating signal; and
   a signal processing circuit, electrically connected to the frequency-selective circuit, wherein the signal processing circuit is arranged to deal with an input signal received by the signal input port and arranged to deal with output signals generated from the first and second signal output ports;
   wherein the input signal includes a first signal component with a first frequency and a second signal component with a second frequency, an offset between the first frequency and a frequency of the oscillating signal is smaller than an offset between the second frequency and the frequency of the oscillating signal, and an attenuation applied to the second signal component by the frequency response control block is greater than an attenuation applied to the first signal component by the frequency response control block.

2. A signal processing apparatus, comprising:
   a frequency-selective circuit, comprising:
      a signal input port;
      a first signal output port;
      a second signal output port; and
      a frequency response control block, electrically connected between the second signal output port and a signal path between the signal input port and the first signal output port, the frequency response control block arranged to control a frequency response according to a frequency of an oscillating signal; and
   a signal processing circuit, electrically connected to the frequency-selective circuit, wherein the signal processing circuit is arranged to deal with an input signal received by the signal input port and arranged to deal with output signals generated from the first and second signal output ports;
   wherein a frequency response of the frequency-selective circuit has a first gain at a first frequency and a second gain at a second frequency, an offset between the first frequency and a frequency of the oscillating signal is smaller than an offset between the second frequency and the frequency of the oscillating signal, and the first gain is greater than the second gain.

3. A signal processing apparatus, comprising:
   a frequency-selective circuit, comprising:
      a signal input port;
      a first signal output port;
      a second signal output port; and
      a frequency response control block, electrically connected between the second signal output port and a signal path between the signal input port and the first signal output port, the frequency response control block arranged to control a frequency response according to a frequency of an oscillating signal; and
   a signal processing circuit, electrically connected to the frequency-selective circuit, wherein the signal processing circuit is arranged to deal with an input signal received by the signal input port and arranged to deal with output signals generated from the first and second signal output ports;
   wherein an input impedance response of the frequency response control block has a first impedance value at a first frequency and a second impedance value at a second frequency, an offset between the first frequency and a frequency of the oscillating signal is smaller than an offset between the second frequency and the frequency of the oscillating signal, and the first impedance value is greater than the second impedance value.

4. A signal processing apparatus, comprising:
   a frequency-selective circuit, comprising:
      a signal input port;
      a first signal output port;
      a second signal output port; and
      a frequency response control block, electrically connected between the second signal output port and a signal path between the signal input port and the first signal output port, the frequency response control block arranged to control a frequency response according to a frequency of an oscillating signal; and
   a signal processing circuit, electrically connected to the frequency-selective circuit, wherein the signal processing circuit is arranged to deal with an input signal received by the signal input port and arranged to deal with output signals generated from the first and second signal output ports;
   wherein the frequency response control block comprises:
      a mixer module, having a first port electrically connected to the signal path between the signal input port and the signal output port, a second port, and a local oscillator (LO) port, wherein the mixer module operates according to the oscillating signal received by the LO port; and
      a filter module, electrically connected between the second port of the mixer module and the second signal output port, wherein an output of the filter module is directly connected to the second output port.

5. The signal processing apparatus of claim 1, wherein the signal processing circuit is a receiving circuit.

6. A signal processing apparatus, comprising:
- a frequency-selective circuit, comprising:
  - a signal input port;
  - a first signal output port;
  - a second signal output port; and
  - a frequency response control block, comprising:
    - a first mixer module, having a first port, a second port, and a local oscillator (LO) port, wherein the first port is electrically connected to a signal path between the signal input port and the first signal output port, and the first mixer module operates according to a first LO input received by the LO port; and
    - a first filter module, electrically connected between the second port of the first mixer module and the second signal output port, wherein an output of the first filter module is directly connected to the second signal output port; and
- a signal processing circuit, electrically connected to the frequency-selective circuit, comprising:
  - a first circuit module, arranged to deal with an input signal received by the signal input port; and
  - a second circuit module, arranged to deal with output signals generated from the first and second signal output ports.

7. The signal processing apparatus of claim 6, wherein the signal processing circuit is a receiving circuit, the first circuit module is a signal amplification stage of the receiving circuit, and the second circuit module is a down-conversion stage of the receiving circuit.

8. A signal processing apparatus, comprising:
- a frequency-selective circuit, comprising:
  - a signal input port;
  - a first signal output port;
  - a second signal output port; and
  - a frequency response control block, comprising:
    - a first mixer module, having a first port, a second port, and a local oscillator (LO) port, wherein the first port is electrically connected to a signal path between the signal input port and the first signal output port, and the first mixer module operates according to a first LO input received by the LO port; and
    - a first filter module, electrically connected between the second port of the first mixer module and the second signal output port; and
- a signal processing circuit, electrically connected to the frequency-selective circuit, comprising:
  - a first circuit module, arranged to deal with an input signal received by the signal input port; and
  - a second circuit module, arranged to deal with output signals generated from the first and second signal output ports;
- wherein the signal processing circuit is a receiving circuit, the first circuit module is a signal amplification stage of the receiving circuit, the second circuit module is a down-conversion stage of the receiving circuit, and the down-conversion stage comprises:
  - a second mixer module, operating according to the first LO input;
  - a second filter module, having an input port electrically connected to the second mixer module and the second signal output port such that a combined signal derived from outputs of the second mixer module and the first filter module is fed into the input port of the second filter module; and
  - an oscillator module, arranged to generate the first LO input to both of the first mixer module and the second mixer module.

9. The signal processing apparatus of claim 8, wherein a resistance value of a first resistor of the first filter module is greater than a resistance value of a second resistor of the second filter module, and a capacitance value of a first capacitor of the first filter module is greater than a capacitance value of a second capacitor of the second filter module.

10. The signal processing apparatus of claim 8, wherein a turn-on resistance of the second mixer module is greater than a turn-on resistance of the first mixer module.

11. A signal processing apparatus, comprising:
- a frequency-selective circuit, comprising:
  - a signal input port;
  - a first signal output port;
  - a second signal output port; and
  - a frequency response control block, comprising:
    - a first mixer module, having a first port, a second port, and a local oscillator (LO) port, wherein the first port is electrically connected to a signal path between the signal input port and the first signal output port, and the first mixer module operates according to a first LO input received by the LO port; and
    - a first filter module, electrically connected between the second port of the first mixer module and the second signal output port; and
- a signal processing circuit, electrically connected to the frequency-selective circuit, comprising:
  - a first circuit module, arranged to deal with an input signal received by the signal input port; and
  - a second circuit module, arranged to deal with output signals generated from the first and second signal output ports;
- wherein the signal processing circuit is a receiving circuit, the first circuit module is a signal amplification stage of the receiving circuit, the second circuit module is a down-conversion stage of the receiving circuit, and the frequency response control block further comprises:
  - a first oscillator module, electrically connected to the first mixer module and arranged to generate the first LO input to the first mixer module; and
- the down-conversion stage comprises:
  - a second mixer module, operating according to a second LO input;
  - a second oscillator module, electrically connected to the second mixer module and arranged to generate the second LO input to the second mixer module; and
  - a second filter module, having an input port electrically connected to the second mixer module and the second signal output port such that a combined signal derived from outputs of the second mixer module and the first filter module is fed into the input port of the second filter module.

12. The signal processing apparatus of claim 11, wherein a resistance value of a first resistor of the first mixer module is greater than a resistance value of a second resistor of the second mixer module, and a capacitance value of a first capacitor of the first mixer module is greater than a capacitance value of a second capacitor of the second mixer module.

13. The signal processing apparatus of claim 11, wherein a turn-on resistance of the second mixer module is greater than a turn-on resistance of the first mixer module.

14. A signal processing apparatus, comprising:
a frequency-selective circuit, comprising:
   a signal input port;
   a first signal output port;
   a second signal output port; and
   a frequency response control block, comprising:
      a first mixer module, having a first port, a second port, and a local oscillator (LO) port, wherein the first port is electrically connected to a signal path between the signal input port and the first signal output port, and the first mixer module operates according to a first LO input received by the LO port; and
      a first filter module, electrically connected between the second port of the first mixer module and the second signal output port; and
a signal processing circuit, electrically connected to the frequency-selective circuit, comprising:
   a first circuit module, arranged to deal with an input signal received by the signal input port; and
   a second circuit module, arranged to deal with output signals generated from the first and second signal output ports;
wherein the signal processing circuit is a receiving circuit, the first circuit module is a signal amplification stage of the receiving circuit, the second circuit module is a down-conversion stage of the receiving circuit, and the down-conversion stage comprises:
   a second mixer module, operating according to the first LO input;
   a second filter module, having an input port electrically connected to the second mixer module and an output port electrically connected to the second signal output port such that a combined signal is derived from outputs of the second filter module and the first filter module; and
   an oscillator module, arranged to generate the first LO input to both of the first mixer module and the second mixer module.

15. The signal processing apparatus of claim 14, wherein a resistance value of a first resistor of the first mixer module is greater than a resistance value of a second resistor of the second mixer module, and a capacitance value of a first capacitor of the first mixer module is greater than a capacitance value of a second capacitor of the second mixer module.

16. The signal processing apparatus of claim 14, wherein a turn-on resistance of the second mixer module is greater than a turn-on resistance of the first mixer module.

17. A signal processing apparatus, comprising:
a frequency-selective circuit, comprising:
   a signal input port;
   a first signal output port;
   a second signal output port; and
   a frequency response control block, comprising:
      a first mixer module, having a first port, a second port, and a local oscillator (LO) port, wherein the first port is electrically connected to a signal path between the signal input port and the first signal output port, and the first mixer module operates according to a first LO input received by the LO port; and
      a first filter module, electrically connected between the second port of the first mixer module and the second signal output port; and
a signal processing circuit, electrically connected to the frequency-selective circuit, comprising:
   a first circuit module, arranged to deal with an input signal received by the signal input port; and
   a second circuit module, arranged to deal with output signals generated from the first and second signal output ports;
wherein the signal processing circuit is a receiving circuit, the first circuit module is a signal amplification stage of the receiving circuit, the second circuit module is a down-conversion stage of the receiving circuit, and the frequency response control block further comprises:
   a first oscillator module, electrically connected to the first mixer module and arranged to generate the first LO input to the first mixer module; and
the down-conversion stage comprises:
   a second mixer module, operating according to a second LO input;
   a second oscillator module, electrically connected to the second mixer module and arranged to generate the second LO input to the second mixer module; and
   a second filter module, having an input port electrically connected to the second mixer module and an output port electrically connected to the second signal output port such that a combined signal is derived from outputs of the first filter module and the second filter module.

18. The signal processing apparatus of claim 17, wherein a resistance value of a first resistor of the first mixer module is greater than a resistance value of a second resistor of the second mixer module, and a capacitance value of a first capacitor of the first mixer module is greater than a capacitance value of a second capacitor of the second mixer module.

19. The signal processing apparatus of claim 17, wherein a turn-on resistance of the second mixer module is greater than a turn-on resistance of the first mixer module.

20. A signal processing apparatus, comprising:
a frequency-selective circuit, comprising:
   a signal input port;
   a first signal output port;
   a second signal output port; and
   a frequency response control block, comprising:
      a first mixer module, having a first port, a second port, and a local oscillator (LO) port, wherein the first port is electrically connected to a signal path between the signal input port and the first signal output port, and the first mixer module operates according to a first LO input received by the LO port; and
      a first filter module, electrically connected between the second port of the first mixer module and the second signal output port;
a signal processing circuit, electrically connected to the frequency-selective circuit, comprising:
   a first circuit module, arranged to deal with an input signal received by the signal input port; and
   a second circuit module, arranged to deal with output signals generated from the first and second signal output ports; and
a blocker detector, arranged to detect existence of a blocker signal in the input signal and accordingly generate a detecting result;
wherein when the detecting result indicates that the input signal does not have the blocker signal, the blocker detector is further arranged to adjust at least one resistor included in the frequency response control block and the second circuit module for reducing a resistance value thereof.

21. The signal processing apparatus of claim 6, wherein the second circuit module includes a transimpedance amplifier arranged to convert a current output into a voltage signal.

22. A method of setting filtering characteristic of a signal processing apparatus, comprising:
- configuring a first signal processing path, included in the signal processing apparatus and electrically connected to a signal input port of the signal processing apparatus, to have a first filtering characteristic; and
- configuring a second signal processing path, included in the signal processing apparatus and electrically connected between the signal input port and the first signal processing path, to have a second filtering characteristic different from the first filtering characteristic;
- wherein the signal processing apparatus has a first filter module disposed at the first signal processing path and a second filter module disposed at the second signal processing path; the step of configuring the first signal processing path comprises setting a resistance value of a first resistor of the first filter module and setting a capacitance value of a first capacitor of the first filter module; and the step of configuring the second signal processing path comprises setting a resistance value of a second resistor of the second filter module to be greater than the resistance value of the first resistor and setting a capacitance value of a second capacitor of the second filter module to be greater than the capacitance value of the first capacitor.

23. A method of setting filtering characteristic of a signal processing apparatus, comprising:
- configuring a first signal processing path, included in the signal processing apparatus and electrically connected to a signal input port of the signal processing apparatus, to have a first filtering characteristic;
- configuring a second signal processing path, included in the signal processing apparatus and electrically connected between the signal input port and the first signal processing path, to have a second filtering characteristic different from the first filtering characteristic;
- detecting existence of the second signal component in the input signal received at the signal input port and accordingly generate a detecting result; and
- when the detecting result indicates that the input signal does not have the second signal component, adjusting at least one resistor disposed at the first signal processing path and the second signal processing path for decreasing a resistance value thereof.

* * * * *